United States Patent
Sato (10) Patent No.: US 10,061,086 B2
(45) Date of Patent: Aug. 28, 2018

(54) BEAM DISTRIBUTOR

(71) Applicant: FANUC CORPORATION, Yamanashi (JP)

(72) Inventor: Takanori Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/787,115

(22) Filed: Oct. 18, 2017

(65) Prior Publication Data

US 2018/0113258 A1 Apr. 26, 2018

(30) Foreign Application Priority Data

Oct. 20, 2016 (JP) ................. 2016-205743

(51) Int. Cl.
*H04B 10/00* (2013.01)
*G02B 6/35* (2006.01)
*G02B 6/12* (2006.01)

(52) U.S. Cl.
CPC ....... *G02B 6/3516* (2013.01); *G02B 6/12033* (2013.01); *G02B 6/3504* (2013.01); *G02B 2006/12164* (2013.01)

(58) Field of Classification Search
USPC ................................. 398/135–139
See application file for complete search history.

(56) References Cited

U.S. PATENT DOCUMENTS 2,217,236 A * 10/1940 Schafer ............. G01J 1/22
356/230
2,840,632 A * 6/1958 Parker ............. H04N 3/06
348/196
3,632,871 A * 1/1972 Watkins ............. H04N 3/08
348/203
4,019,804 A * 4/1977 Collier ............. G02B 5/09
250/236
4,201,222 A * 5/1980 Haase ............. A61B 5/02154
600/311
4,320,941 A * 3/1982 Dashwood ............. G03B 41/06
352/108
4,669,817 A * 6/1987 Mori ............. A01G 7/045
359/591

(Continued)

FOREIGN PATENT DOCUMENTS

JP H11-113925 A 4/1999

*Primary Examiner* — Agustin Bello
(74) *Attorney, Agent, or Firm* — Studebaker & Brackett PC (57) ABSTRACT

A beam distributor includes a beam entrance and multiple beam exits. The beam distributor includes: a rotatable cylindrical member; at least two multiple reflectors shifted from each other; a rotation mechanism that rotates the multiple reflectors; a fixing mechanism that fixes the reflectors; a reflector position sensing mechanism; a light absorber; and a control unit. The control unit controls the rotation mechanism to rotationally move a rotational position about the cylindrical member to a position where a laser beam is to be reflected on the reflector toward a selected beam exits, a position where the laser beam is to pass through between adjacent reflectors to be absorbed by the light absorber, or a position where the laser beam is to be reflected on the reflector and absorbed by the light absorber. The control unit controls the fixing mechanism so as to fix rotational movements of the reflectors.

8 Claims, 8 Drawing Sheets

(56) References Cited

U.S. PATENT DOCUMENTS

| | | | | |
|---|---|---|---|---|
| 4,716,297 A | * | 12/1987 | Wills | G02B 6/421 250/551 |
| 5,289,493 A | * | 2/1994 | Fink | H01S 3/106 372/100 |
| 5,610,747 A | * | 3/1997 | Jacobsen | G02B 6/43 257/E25.01 |
| 5,784,186 A | * | 7/1998 | Wang | G02B 5/09 359/200.1 |
| 5,886,806 A | * | 3/1999 | Wang | G02B 5/09 359/198.1 |
| 5,907,423 A | * | 5/1999 | Wang | G02B 5/09 359/201.1 |
| 6,134,003 A | * | 10/2000 | Tearney | A61B 1/00096 356/479 |
| 6,344,846 B1 | * | 2/2002 | Hines | G06F 3/0312 345/156 |
| 6,407,872 B1 | * | 6/2002 | Lai | G02B 26/108 359/833 |
| 6,669,145 B1 | * | 12/2003 | Green | B64D 39/00 244/135 A |
| 6,813,050 B2 | * | 11/2004 | Chen | G01N 21/4795 250/234 |
| 6,850,364 B2 | * | 2/2005 | Xie | G02B 6/272 359/489.05 |
| 6,993,260 B2 | * | 1/2006 | Byers | H04B 10/1149 398/115 |
| 7,046,412 B2 | * | 5/2006 | Dorney | G01N 21/636 359/226.1 |
| 7,428,086 B2 | * | 9/2008 | Dufour | G02B 17/023 359/196.1 |
| 7,720,388 B2 | * | 5/2010 | Varshneya | G01S 7/481 398/136 |
| 7,899,332 B2 | * | 3/2011 | Shindou | H04B 10/801 398/114 |
| 8,235,605 B2 | * | 8/2012 | Kim | G02B 6/4246 359/629 |
| 8,294,971 B2 | * | 10/2012 | Lai | G02B 26/108 359/211.2 |
| 8,390,910 B2 | * | 3/2013 | Zimdars | G02B 26/06 359/212.1 |
| 8,488,968 B2 | * | 7/2013 | Atta | H04B 10/803 398/114 |
| 8,818,193 B2 | * | 8/2014 | Chen | G02B 6/272 398/119 |
| 2004/0258417 A1 | * | 12/2004 | Volpi | H04B 10/1125 398/135 |
| 2006/0263093 A1 | * | 11/2006 | Shinagawa | G01D 21/00 398/135 |
| 2008/0013960 A1 | * | 1/2008 | Tearney | A61B 1/07 398/139 |
| 2010/0226655 A1 | * | 9/2010 | Kim | G02B 6/4246 398/139 |
| 2013/0108262 A1 | * | 5/2013 | Lim | G02B 6/4215 398/43 |
| 2015/0125152 A1 | * | 5/2015 | Ji | H04B 10/5561 398/76 |
| 2018/0113258 A1 | * | 4/2018 | Sato | G02B 6/12033 |

* cited by examiner

BEAM DISTRIBUTOR

BACKGROUND OF THE INVENTION

This application is based on and claims the benefit of priority from Japanese Patent Application No. 2016-205743, filed on 20 Oct. 2016, the content of which is incorporated herein by reference.

Field of the Invention

The present invention relates to a beam distributor.

Related Art

According to a beam distributor conventionally known, multiple optical fibers are switched to select one optical fiber and one laser beam is caused to propagate through the selected optical fiber (see patent document 1). The beam distributor described in patent document 1 is configured in such a manner that the multiple optical fibers are switched to select one optical fiber by providing one reflector and one motor at a position for laser beam switching depending the numbers of the multiple optical fibers to be switched and by adjusting an angle of tilt for the reflector using the motor.

Patent Document 1: Japanese Unexamined Patent Application, Publication No. H11-113925

SUMMARY OF THE INVENTION

The beam distributor described in patent document 1 requires one reflector and one motor for each of the multiple optical fibers to be switched. Hence, increase in the number of the multiple optical fibers to be switched results in increase in the number of reflectors to be used and that of motors to be used. Increase in the number of motors to be used increases cost, so that a beam distributor achieving cost reduction has been desired.

The present invention is intended to provide a beam distributor achieving cost reduction.

(1) The present invention relates to a beam distributor (beam distributor 1 described later, for example) including at least one beam entrance (beam entrance 31 described later, for example) and at least two multiple beam exits (beam exits 41 described later, for example). The beam distributor includes: a cylindrical member (cylindrical rotator 2, 2A, first cylindrical rotator 5, second cylindrical rotator 6 described later, for example) rotatable about a central axis as a rotary axis (rotary axis J described later, for example); at least two multiple reflectors (switchable reflectors 23, switchable reflectors 53, switchable reflectors 63 described later, for example) of the same number as the beam exits, the multiple reflectors being arranged at positions shifted from each other axially and circumferentially along a circumferential surface of the cylindrical member; a rotation mechanism (rotary drive motor 12, 14, 15 described later, for example) that rotates the multiple reflectors about the rotary axis by rotating the cylindrical member about the rotary axis; a fixing mechanism (brake mechanism 13 described later, for example) that fixes circumferential movement of the cylindrical member at the reflectors by fixing circumferential movement at the cylindrical member; a reflector position sensing mechanism (mirror position sensor 43 described later, for example) that senses a position of one of the reflectors; a light absorber (absorber 11 described later, for example); and a control unit (control unit 81 described later, for example) that controls the rotation mechanism so as to rotationally move the reflectors and controls the fixing mechanism so as to fix the reflectors. The control unit controls the rotation mechanism so as to rotationally move a rotational position about the cylindrical member to a position where an input laser beam input through the beam entrance and traveling parallel to the rotary axis of the cylindrical member is to be reflected on one of the reflectors toward a selected one of the beam exits, a position where the input laser beam is to pass through between adjacent ones of the reflectors to be absorbed by the light absorber, or a position where the input laser beam is to be reflected on one of the reflectors and absorbed by the light absorber. The control unit controls the fixing mechanism so as to fix rotational movements of the reflectors at positions to which the reflectors have been moved rotationally.

(2) In the beam distributor described in (1), members forming the multiple reflectors are preferably arranged in such a manner that the multiple reflectors and/or the cylindrical member, applies a weight to the rotary axis uniformly in a balanced manner in response to a number of the reflectors, weights of the multiple reflectors, or balance of a weight of the cylindrical member applied to the rotary axis.

(3) In the beam distributor described in (1) or (2), the rotation mechanism preferably includes a servo motor and a position detector that detects a rotational position about the servo motor.

(4) The beam distributor described in any one of (1) to (3), preferably includes multiple rotator units (first rotator unit 50, second rotator unit 60 described later, for example) each including the cylindrical member and the rotation mechanism that rotates the cylindrical member. The multiple rotator units are preferably aligned along a path for a laser beam, and the beam exits for output of the laser beam are preferably selectively switched by moving the reflectors to be rotated by the rotation mechanisms while being combined in multiple stages along the path for the laser beam to positions causing reflection of the laser beam or positions not causing reflection of the laser beam.

(5) The beam distributor described in any one of (1) to (4), preferably includes a shielding member (case body 10 described later, for example) that covers the cylindrical member and a path for a laser beam.

(6) In the beam distributor described in any one of (1) to (5), the reflector position sensing mechanism is preferably an optical sensor that senses the position of one of the reflectors by reflecting light emitted from a light-emitting part on the reflector and receiving the reflected light at a light-receiving part, or an optical sensor that detects the position of one of the reflectors by sensing light having passed through a slit provided in the reflector.

(7) The beam distributor described in any one of (1) to (6), preferably includes a storage unit (storage unit 82 described later, for example) that stores a rotational angle about the cylindrical member as a parameter for numerical data. The control unit preferably has a function of calibrating the position of the reflector by finely adjusting the parameter for the rotational angle about the cylindrical member stored in the storage unit positively or negatively in response to a signal indicating the position of the reflector sensed by the reflector position sensing mechanism.

(8) In the beam distributor described in any one of (1) to (7), the control unit preferably exerts control to move the reflector to a position where a laser beam is to be reflected toward one of the beam exits by making the rotation mechanism rotate the cylindrical member, thereafter exerts control to make the fixing mechanism apply a brake and then to output the laser beam, and thereafter exerts control to release the brake by the fixing mechanism and then to make the rotation mechanism move the reflector to a next position.

According to the preset invention, a beam distributor achieving cost reduction can be provided.

DETAILED DESCRIPTION OF THE INVENTION

Embodiments of the present invention will be described below by referring to the drawings. In the description of a second embodiment and those of subsequent embodiments, structures common to those of the first embodiment will be identified by the same signs and will not be described.

First Embodiment

Figure 1:
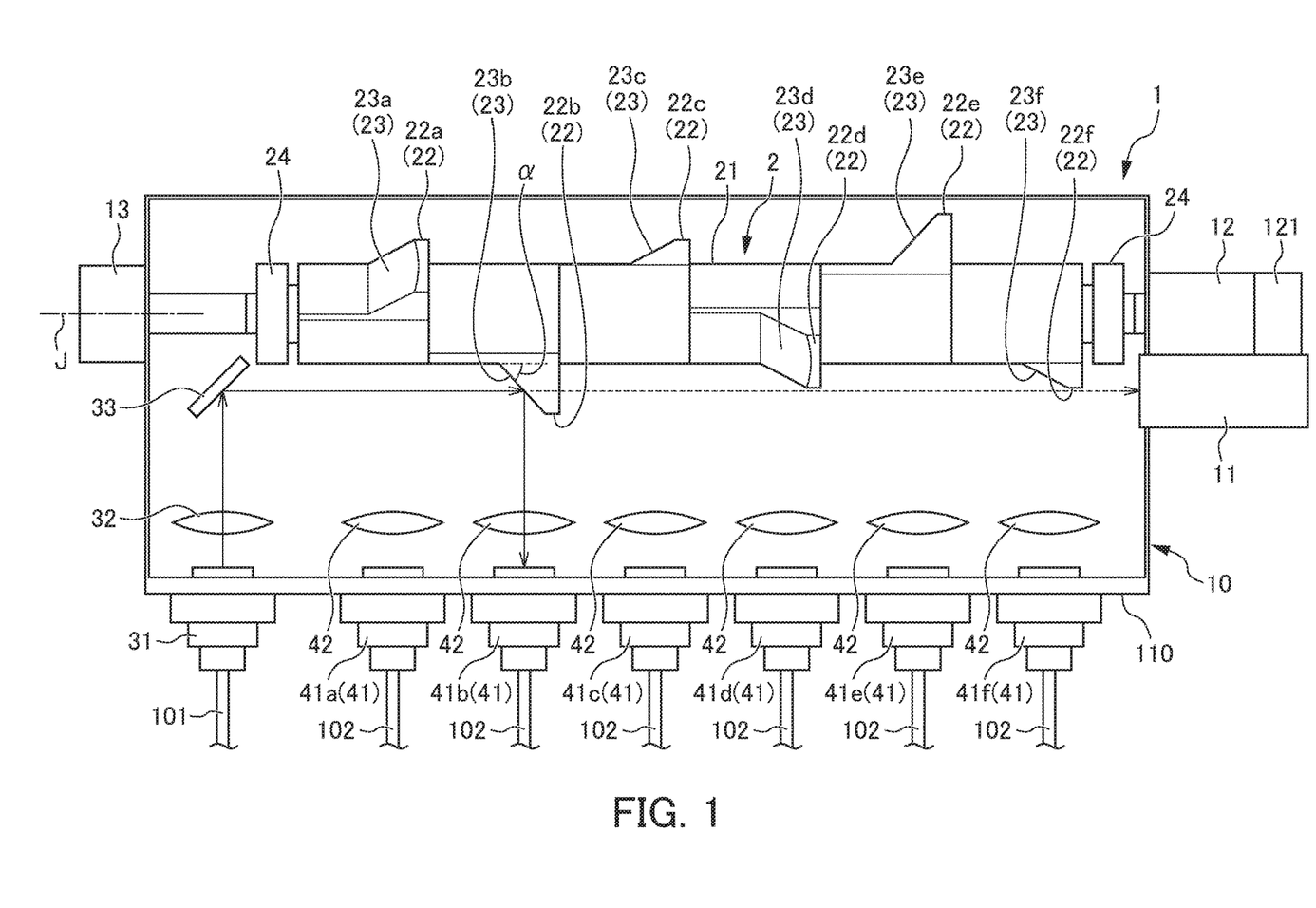
FIG. 1 shows the configuration of a beam distributor according to a first embodiment.
Figure 2:
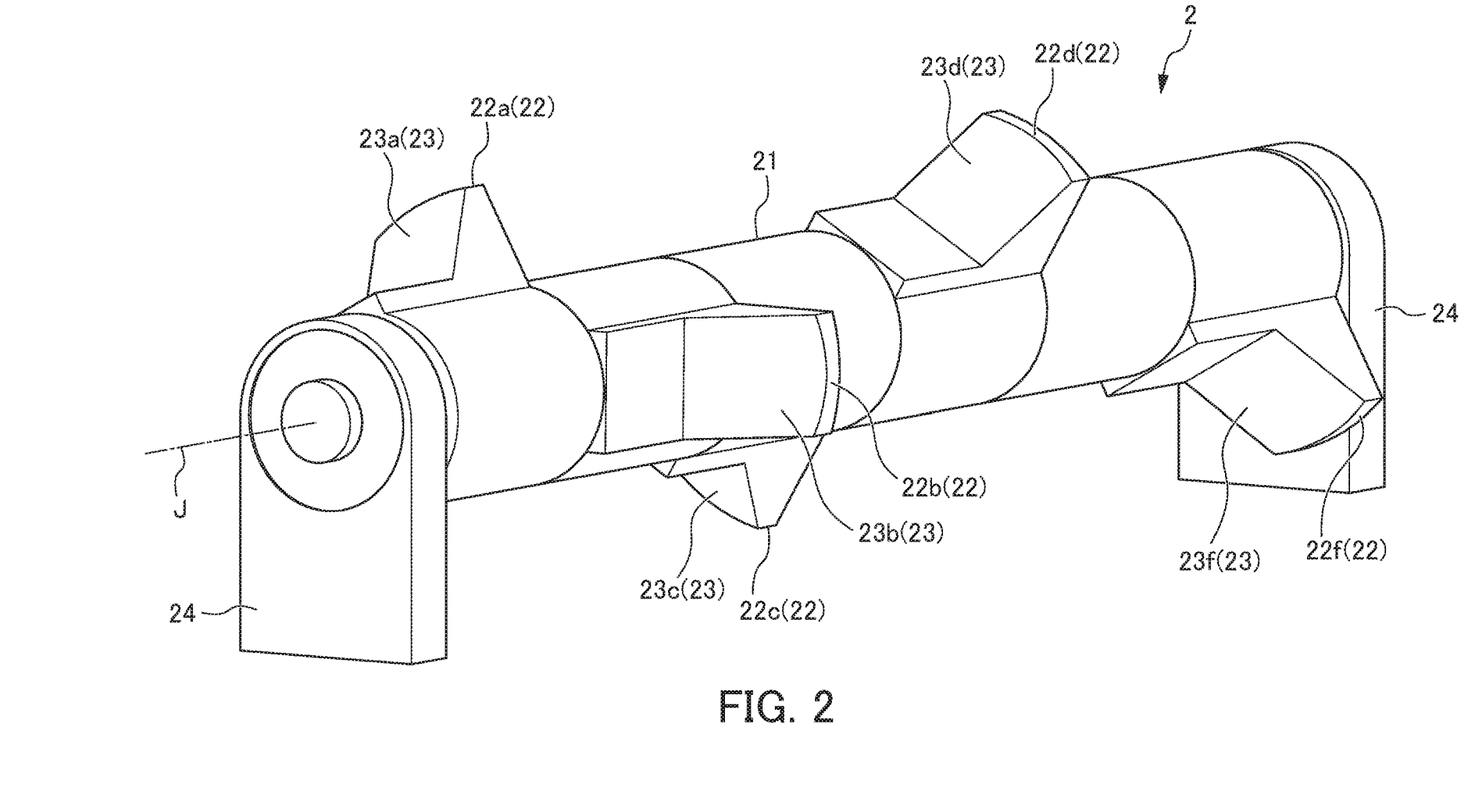
FIG. 2 is a perspective view showing a cylindrical rotator of the beam distributor according to the first embodiment.
Figure 3:
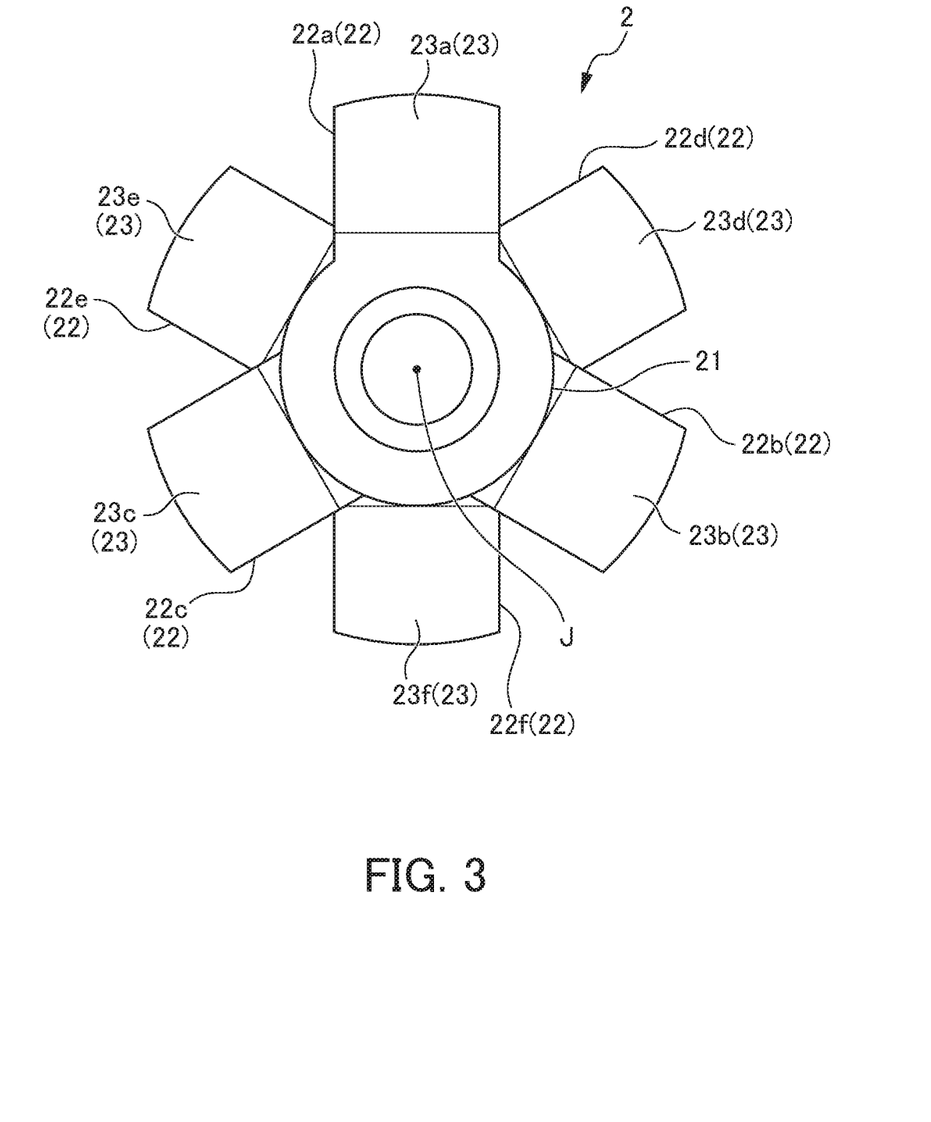
FIG. 3 shows the cylindrical rotator of the beam distributor according to the first embodiment when viewed in the direction of a rotary axis.
Figure 4:
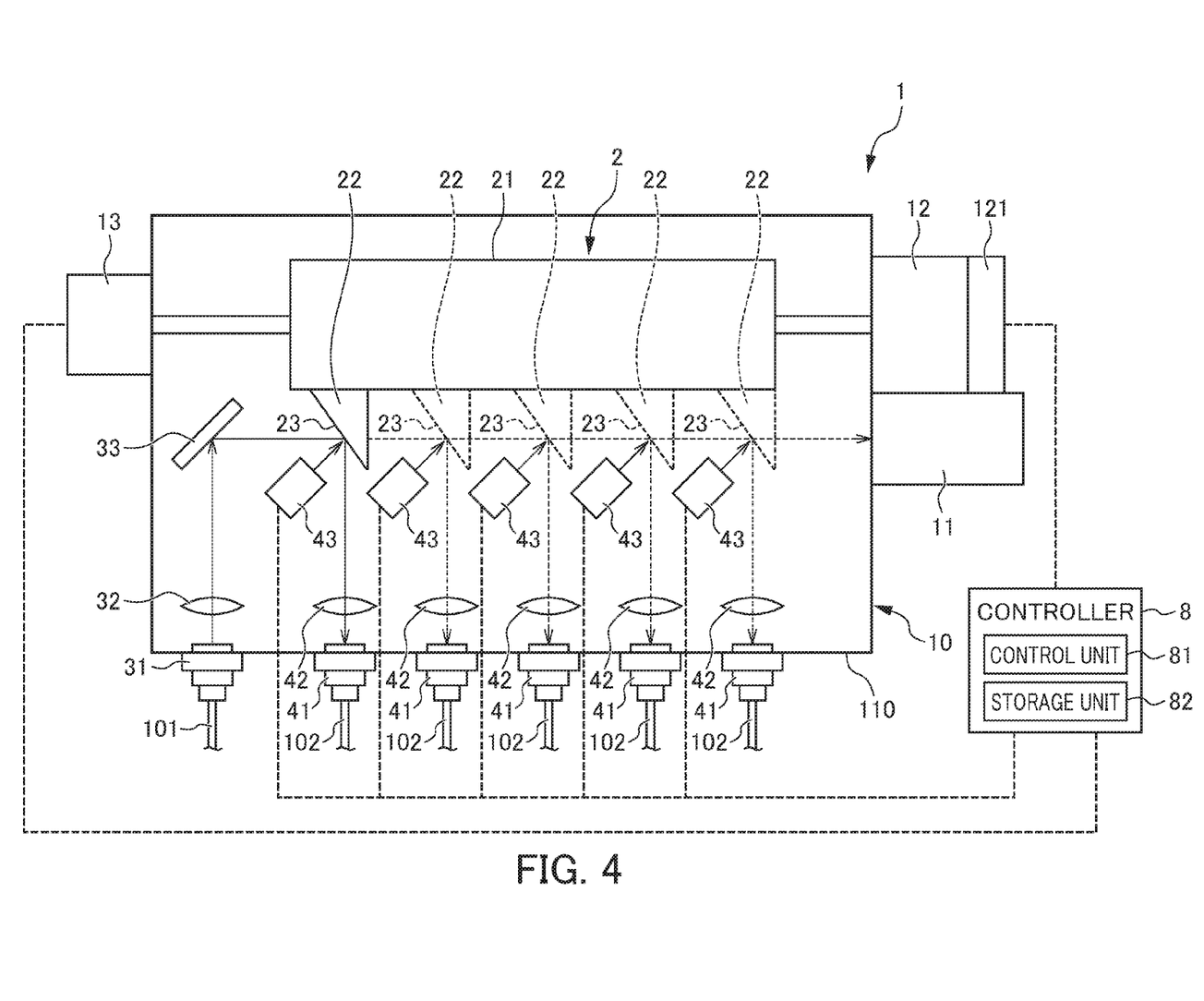
FIG. 4 shows the configuration of the beam distributor according to the first embodiment.

FIG. 1 shows the configuration of a beam distributor 1 according to a first embodiment. FIG. 2 is a perspective view showing a cylindrical rotator 2 of the beam distributor 1 according to the first embodiment. FIG. 3 shows the cylindrical rotator 2 of the beam distributor 1 according to the first embodiment when viewed in the direction of a rotary axis J. FIG. 4 shows the configuration of the beam distributor 1 according to the first embodiment.

The beam distributor 1 according to the first embodiment is a device for selectively switching a laser beam (laser light) to any of multiple output-side optical fibers 102 after the laser beam is output from a laser device (not shown in the drawings) and then input through an input-side optical fiber 101. The laser beam selectively switched by the beam distributor 1 is caused to propagate through the output-side optical fiber 102 to be used for welding or cutting during laser machining.

As shown in FIG. 1, the beam distributor 1 includes a cylindrical rotator (cylindrical member) 2 with six switchable reflectors 23 (reflectors), one beam entrance 31, one light-input lens 32, one input-side reflector 33, six beam exits 41, six light-output lenses 42, six mirror position sensors 43 (reflector position sensing mechanisms) (see FIG. 4), an absorber 11 (light absorber), a rotary drive motor 12 (rotation mechanism), a brake mechanism 13 (fixing mechanism), a case body 10, and a controller 8 (see FIG. 4).

The case body 10 is formed into a box-like shape extending from the left side to the right side of FIG. 1. The case body 10 houses at least the cylindrical rotator 2, the one light-input lens 32, the input-side reflector 33, the six light-output lenses 42, and the six mirror position sensors 43 (see FIG. 4). The case body 10 covers the cylindrical rotator 2 and a path for a laser beam from the beam entrance 31 to the beam exits 41, thereby implementing a function as a shielding member that shields scattered light of a laser beam. The case body 10 has multiple attachment openings (not shown in the drawings) for attachment of corresponding members of the beam distributor 1 (one beam entrance 31, six beam exits 41, absorber 11, and rotary driver motor 12).

The one beam entrance 31 is attached to the case body 10 to be adjacent to the left end side (one end side) of a front plate 110 of the case body 10 in a longitudinal direction. A laser beam output from a laser output device (not shown in the drawings) is input to the beam entrance 31 through the input-side optical fiber 101.

The one light-input lens 32 is arranged inside the case body 10 more deeply than the one beam entrance 31. The one light-input lens 32 causes a laser beam input through the one beam entrance 31 to pass through. The one light-input lens 32 is a lens that forms the shape of light of a laser beam input through the one beam entrance 31.

The one input-side reflector 33 causes a laser beam input through the beam entrance 31 (input laser beam) to propagate parallel to a rotary axis J of the cylindrical rotator 2 described later. In this embodiment, the one input-side reflector 33 is arranged inside the case body 10 more deeply than the beam entrance 31 and the light-input lens 32. The input-side reflector 33 reflects a laser beam in such a manner that the laser beam travels in a direction at right angles to an angle at which the laser beam has been input, for example. The input-side reflector 33 has a tilted surface and is arranged at a tilt angle of 45 degrees from a direction in which a laser beam input through the beam entrance 31 travels.

The six beam exits 41 are aligned along the front plate 110 of the case body 10 from a position on the right side of the beam entrance 31 and adjacent to the beam entrance 31 toward the right end side (opposite end side) of the front plate 110 of the case body 10.

In this embodiment, the one input-side reflector 33 and the six beam exits 41 are aligned along the front plate 110 of the case body 10 from the left side (one end side) toward the right side (opposite end side) in the following order: the beam entrance 31, a beam exit 41a, a beam exit 41b, a beam exit 41c, a beam exit 41d, a beam exit 41e, and a beam exit 41f. Where the beam exits 41a, 41b, 41c, 41d, 41e, and 41f are not required to be distinguished from each other, these exits will simply be called the "beam exit 41."

The output-side optical fibers 102 are connected to corresponding ones of the six beam exits 41. A laser beam is output selectively from any of the sixth beam exits 41 selected in response to a rotational angle about the switchable reflector 23 of the cylindrical rotator 2 described later.

The six light-output lenses 42 are arranged inside the case body 10 more deeply than the six beam exits 41. Each of the six light-output lenses 42 causes a laser beam reflected on the switchable reflector 23 of the cylindrical rotator 2 to pass through. Each of the six light-output lenses 42 is a lens that forms the shape of light of a laser beam reflected on the switchable reflector 23 of the cylindrical rotator 2.

As shown in FIGS. 1 and 2, the cylindrical rotator 2 includes a rotator body 21 and six tilted protrusions 22. The rotator body 21 is formed into a cylindrical shape extending in a predetermined direction in such a manner that the longitudinal direction of the case body 10 and a direction in which the rotary axis J extends agree with each other. The cylindrical rotator 2 is rotatable about the rotary axis J as a central axis. The rotator body 21 is held by holding members 24 at the opposite ends of the longitudinal direction while being rotatable about the rotary axis J.

The brake mechanism 13 is connected to one end (In FIG. 1, the left end) of the rotator body 21. The brake mechanism 13 is controlled by a control unit 81 described later to fix the cylindrical rotator 2 at a predetermined position after the cylindrical rotator 2 is moved by the rotary drive motor 12 so as not to rotationally move the cylindrical rotator 2 circumferentially. The brake mechanism 13 fixes circumferential movements of the six switchable reflectors 23 by fixing circumferential movement at the cylindrical rotator 2.

The rotary drive motor 12 is fixed to an opposite end (In FIG. 1, the right end) of the rotator body 21. The rotary drive motor 12 is formed of a servo motor and includes a built-in position detector 121. The rotary drive motor 12 is controlled by the control unit 81 described later based on position information about a position detected by the position detector 121 to rotate the cylindrical rotator 2 about the rotary axis J. The rotary drive motor 12 rotates the cylindrical rotator 2 about the rotary axis J, thereby rotating the six switchable reflectors 23 about the rotary axis J. The position detector 121 may be provided in the rotary drive motor 12. Alternatively, the position detector 121 may not be provided in the rotary drive motor 12 but may be connected to the rotary drive motor 12.

The six tilted protrusions 22 are formed to protrude in the radial direction of the rotator body 21 from the circumferential surface of the rotator body 21. The six tilted protrusions 22 are spaced apart from each other in the longitudinal direction of the rotator body 21. In this embodiment, the six tilted protrusions 22 are aligned from left to right in the direction of the rotary axis J in the following order: a tilted protrusion 22a, a tilted protrusion 22b, a tilted protrusion 22c, a tilted protrusion 22d, a tilted protrusion 22e, and a tilted protrusion 22f. Where the tilted protrusions 22a, 22b, 22c, 22d, 22e, and 22f are not required to be distinguished from each other, these protrusions will simply be called the "tilted protrusion 22."

The six tilted protrusions 22 are arranged at positions shifted from each other axially and circumferentially along the circumferential surface of the rotator body 21 in response to positions where corresponding ones of the six beam exits 41 are arranged. The tilted protrusion 22 has a tilted surface that is tilted so as to be separated further from the rotary axis J of the rotator body 21 in a direction from the beam entrance 31 (from the left side of FIG. 1) toward the beam exit 41 (right side of FIG. 1).

As shown in FIG. 3, the six tilted protrusions 22a, 22b, 22c, 22d, 22e, and 22f are uniformly arranged circumferentially when viewed in the direction of the rotary axis J. The six tilted protrusions 22a, 22b, 22c, 22d, 22e, and 22f (members forming a switchable reflector 23a, a switchable reflector 23b, a switchable reflector 23c, a switchable reflector 23d, a switchable reflector 23e, and a switchable reflector 23f respectively) are arranged so as to apply weights to the rotary axis J uniformly in a balanced manner.

As shown in FIGS. 1 to 3, the tilted surface of the tilted protrusion 22 forms the switchable reflector 23. The six switchable reflectors 23 provided along the circumferential surface of the rotator body 21 are the same in number as the six beam exits 41. Each of the six switchable reflectors 23 is formed of a surface that is tilted so as to be separated further from the rotary axis J of the rotator body 21 in a direction from the beam entrance 31 toward the beam exit 41. In this embodiment, the six switchable reflectors 23 are aligned from left to right in the direction of the rotary axis J in the following order: the switchable reflectors 23a, 23b, 23c, 23d, 23e, and 23f. Where the switchable reflectors 23a, 23b, 23c, 23d, 23e, and 23f are not required to be distinguished from each other, these reflectors will simply be called the "switchable reflector 23." In response to rotation of the cylindrical rotator 2 about the rotary axis J, each of the six switchable reflectors 23 moves circumferentially while being maintained at a tilt angle from the rotary axis J.

The switchable reflector 23 provided at the tilted surface of the tilted protrusion 22 is tilted at an angle at which an input laser beam traveling along and parallel to the rotary axis J of the cylindrical rotator 2 is to be reflected toward a corresponding one of the beam exits 41. As shown in FIG. 1, the switchable reflector 23 is tilted at an angle $\alpha$ from the rotary axis J, for example. In this embodiment, the tilt angle $\alpha$ is set at 45 degrees for the switchable reflector 23, for example. However, this is not the only tilt angle but the tilt angle can be set appropriately in a manner that depends on a position where the beam exit 41 is arranged or a direction where the beam exit 41 is pointed, for example.

As shown in FIG. 4, each of the six mirror position sensors 43 is provided for a corresponding one of the switchable reflectors 23. As shown in FIG. 4, in this embodiment, each of the six mirror position sensors 43 is arranged at a position facing a corresponding one of the switchable reflectors 23.

The six mirror position sensors 43 determine that corresponding ones of the switchable reflectors 23 are located at their predetermined reflection positions. Each of the mirror position sensors 43 has a light-emitting part (not shown in the drawings) and a light-receiving part (not shown in the drawings). The mirror position sensor 43 reflects light from the light-emitting part on the switchable reflectors 23. If light resulting from the reflection is received normally at the light-receiving part, the mirror position sensor 43 determines that the switchable reflector 23 is located at a predetermined reflection position. This is not the only configuration of the mirror position sensor. For example, a slit may be provided in the switchable reflector 23, and if the light-receiving part normally receives light having passed through the slit, the mirror position sensor may be configured to determine that the switchable reflector 23 is located at a predetermined reflection position.

The absorber 11 is attached to the inner surface of the case body 10, specifically, to the inner side surface on the opposite end side opposite the beam entrance 31 in such a manner that a surface of the absorber 11 for absorption of a laser beam faces the inside of the case body 10. The absorber 11 is arranged at a position a laser beam is to reach after the laser beam reflected on the input-side reflector 33 propagates parallel to the longitudinal direction of the cylindrical rotator 2 and passes through between adjacent ones of the switchable reflectors 23. The absorber 11 absorbs the laser beam having passed through between adjacent ones of the switchable reflectors 23.

As shown in FIG. 4, the controller 8 includes the control unit 81 and a storage unit 82. The control unit 81 rotates the cylindrical rotator 2 and controls the rotary drive motor 12 so as to rotationally move the switchable reflector 23 to a predetermined reflection position. More specifically, based on information about a rotational angle about the cylindrical rotator 2 corresponding to the position of the switchable reflector 23 stored in the storage unit 82, the control unit 81 controls the rotary drive motor 12 so as to rotationally move a rotational position about the cylindrical rotator 2 to a position where a laser beam input through the beam entrance 31 and traveling parallel to the rotary axis J of the cylindrical rotator 2 is to be reflected on the switchable reflector 23 toward a selected one of the beam exits 41, or a position where light of the laser beam input through the beam entrance 31 and traveling parallel to the rotary axis J of the cylindrical rotator 2 is to pass through between adjacent ones of the switchable reflectors 23 to be absorbed by the absorber 11.

The control unit 81 controls the brake mechanism 13 so as to fix rotational movement of the switchable reflector 23 at a position to which the switchable reflector 23 has been moved rotationally.

The control unit 81 exerts control to move the switchable reflector 23 to a position where a laser beam is to be reflected on the switchable reflector 23 toward the beam exit 41 by making the rotary drive motor 12 rotate the cylindrical rotator 2. Next, the control unit 81 exerts control to make the brake mechanism 13 apply a brake and then to output the laser beam. Further, the control unit 81 exerts control to release the brake by the brake mechanism 13 and then to make the rotary drive motor 12 move the switchable reflector 23 to a next position.

If the control unit 81 receives a position sensing signal indicating the position of the switchable reflector 23 sensed by the mirror position sensor 43, the control unit 81 controls the rotary drive motor 12. The control unit 81 has the function of calibrating the position of the switchable reflector 23 by receiving a signal indicating the position of the switchable reflector 23 sensed by the mirror position sensor 43 and finely adjusting a parameter for a rotational angle about the cylindrical rotator 2 stored in the storage unit 82 positively or negatively.

The storage unit 82 stores control programs for execution of corresponding operations of the beam distributor 1, predetermined parameters, etc. For example, the storage unit 82 stores a rotational angle about the cylindrical rotator 2 corresponding to the position of the switchable reflector 23 where a laser beam is to be reflected toward a selected one of the beam exits 41 as a parameter for numerical data.

The operation of the beam distributor 1 having the above-described configuration will be described next. Before use of the beam distributor 1, the position of the switchable reflector 23 is initialized and calibrated. More specifically, the control unit 81 controls the rotary drive motor 12 to move the cylindrical rotator 2 rotationally so as to reflect a laser beam on the switchable reflector 23 toward a selected one of the beam exits 41. Then, the control unit 81 receives a signal indicating the position of the switchable reflector 23 sensed by the mirror position sensor 43. Further, the control unit 81 calibrates the position of the switchable reflector 23 by finely adjusting a parameter for a rotational angle about the cylindrical rotator 2 stored in the storage unit 82 positively or negatively.

Next, the beam distributor 1 is operated. In this embodiment, any one beam exit 41 can be selected from the six beam exits 41 and a laser beam can be caused to propagate to the selected beam exit 41. If the beam exit 41 initially selected is desired to be switched to any different beam exit 41 while the laser beam is output from the beam exit 41 initially selected, the any different beam exit 41 can be selected and can be used. The following describes how the beam distributor 1 operates in this case.

While a laser beam is not input through the beam entrance 31, the beam exit 41 for output of a laser beam is first selected from the six beam exits 41. Then, in order for the laser beam to be output from the beam exit 41 initially selected, the control unit 81 controls the rotary drive motor 12 so as to rotationally move a rotational position about the cylindrical rotator 2 to a position where the laser beam input through the beam entrance 31 and traveling parallel to the rotary axis J of the cylindrical rotator 2 is to be reflected on the switchable reflector 23 toward the beam exit 41 initially selected. The control unit 81 exerts control to stop the cylindrical rotator 2 at a predetermined reflection position based on information sensed by the mirror position sensor 43. This moves a corresponding one of the switchable reflectors 23 to a position where the laser beam propagating parallel to the rotary axis J of the cylindrical rotator 2 is to be reflected toward the selected beam exit 41.

Next, the control unit 81 controls the brake mechanism 13 so as to fix the rotational position about the cylindrical rotator 2. By doing so, while the switchable reflector 23 corresponding to the selected beam exit 41 is located at the reflection position, the cylindrical rotator 2 is fixed circumferentially.

Next, a laser beam is input to the beam distributor 1 through the beam entrance 31. Then, the laser beam input to the beam distributor 1 is reflected on the input-side reflector 33 to be caused to propagate along the rotary axis J of the cylindrical rotator 2. The laser beam propagating along the rotary axis J of the cylindrical rotator 2 is reflected on the switchable reflector 23 corresponding to the beam exit 41 initially selected to propagate toward the beam exit 41 initially selected. After the laser beam reaches the selected beam exit 41, the laser beam propagates to the output-side optical fiber 102 through the beam exit 41.

Next, while input of a laser beam through the beam entrance 31 is not stopped, one of the beam exits 41 different from the beam exit 41 initially selected may be desired to be selected for output of the laser beam. In this case, the control unit 81 releases the brake mechanism 13. Then, the control unit 81 controls the rotary drive motor 12 so as to rotationally move a rotational position about the cylindrical rotator 2 to a position where the laser beam input through the beam entrance 31 and traveling parallel to the rotary axis J of the cylindrical rotator 2 is to be reflected on the switchable reflector 23 toward the beam exit 41 selected next. By doing so, the laser beam propagating parallel to the rotary axis J of the cylindrical rotator 2 is reflected on the switchable reflector 23 corresponding to the beam exit 41 selected next to propagate toward the beam exit 41 selected next. After the laser beam reaches the beam exit 41 selected next, the laser beam propagates to the outside of the beam distributor 1 through the output-side optical fiber 102. Subsequent switching operation for a laser beam will not be described as it is the same as the above-described switching operation for a laser beam.

If a laser beam is not to be output through any of the beam exits 41, the control unit 81 controls the rotary drive motor 12 so as to rotationally move a rotational position about the cylindrical rotator 2 to a position where the laser beam input through the beam entrance 31 and traveling parallel to the rotary axis J of the cylindrical rotator 2 is to pass through between adjacent ones of the switchable reflectors 23 to be absorbed by the absorber 11. By doing so, output of a laser beam can be suspended temporarily while input of a laser beam through the beam entrance 31 is not stopped. Additionally, if a laser beam passes out from between adjacent ones of the switchable reflectors 23 while the cylindrical rotator 2 rotates, light of the laser beam can be absorbed by the absorber 11. This reduces scattering of the laser beam to ensure safety.

The beam distributor 1 according to the first embodiment having the above-described configuration achieves the following effects. In the first embodiment, the beam distributor 1 includes the beam entrance 31 and the six beam exits 41. The beam distributor 1 includes the rotatable cylindrical rotator 2, the six switchable reflectors 23 arranged at positions shifted from each other axially and circumferentially along the circumferential surface of the cylindrical rotator 2, the rotary drive motor 12 that rotates the six switchable reflectors 23 about the rotary axis J, the brake mechanism 13 that fixes circumferential movement of the cylindrical rotator 2 at the switchable reflectors 23, the mirror position sensor 43 that senses the positions of the switchable reflectors 23, the absorber 11, and the control unit 81. The control unit 81 is configured to control the rotary drive motor 12 so as to move a rotational position about the cylindrical rotator 2 to a position where a laser beam is to be reflected on the switchable reflector 23 toward a selected one of the beam exits 41, or a position where the laser beam is to pass through between adjacent ones of the switchable reflectors 23 to be absorbed by the light absorber 11. The control unit 81 is configured to control the brake mechanism 13 so as to fix rotational movement of the switchable reflector 23 at a position to which the switchable reflector 23 has been moved rotationally.

Thus, one of the six beam exits 41 can be selected and a laser beam can be caused to propagate toward a selected optical fiber only by controlling a rotational angle about the cylindrical rotator 2. Further, the cylindrical rotator 2 can be fixed stably by the brake mechanism 13, so that a reflection position and a reflection angle about the switchable reflector 23 can be determined with increased accuracy. Additionally, the cylindrical rotator 2 can be fixed while power supply to the rotary drive motor 12 is stopped. Stopping power supply to the rotary drive motor 12 achieves saving of power required for the rotary drive motor 12 to maintain the cylindrical rotator 2 in a halt condition. Further, rotation of the cylindrical rotator 2 is controlled so as to cause a laser beam to pass through between adjacent ones of the switchable reflectors 23 to absorb the laser beam by the absorber 11. By doing so, even if a state in the presence of an input laser beam continues, a suspended state where the laser beam is not to be output from any of the beam exits 41 can be produced. Further, by the presence of the absorber 11, a laser beam passing through between adjacent ones of the switchable reflectors 23 can be absorbed by the absorber 11 while input of a laser beam continues. By doing so, scattering of the laser beam can be reduced.

In this embodiment, the six switchable reflectors 23 are configured to be arranged so as to apply weights to the rotary axis J uniformly in a balanced manner. This can reduce nonuniform rotation or vibration of the cylindrical rotator 2, so that the cylindrical rotator 2 can be rotated stably. As a result, a reflection position and a reflection angle about the switchable reflector 23 can be determined with increased accuracy.

In this embodiment, the rotary drive motor 12 includes the servo motor and the position detector 121 that detects a rotational position about the servo motor. This achieves control over the servo motor based on position information about a position detected by the position detector 121. This increases a resolution in determining the position of the switchable reflector 23. Further, by using a rotational angle about the cylindrical rotator 2 as a parameter and based on information sensed by the mirror position sensor 43, a rotational angle about the switchable reflector 23 can easily be adjusted finely.

In this embodiment, the case body 10 is configured to have a function as the shielding member that covers the cylindrical rotator 2 and a path for a laser beam. Thus, while a laser beam is not stopped, the case body 10 can shield scattered light caused by the switchable reflector 23 where the beam exit 41 for output of a laser beam is switched. As a result, a high-quality laser beam not causing scattered light is allowed to propagate to the beam exit 41.

In this embodiment, the mirror position sensor 43 is provided. This makes it possible to easily determine whether or not the switchable reflector 23 is located at a reflection position where a laser beam can be reflected toward a selected one of the beam exits 41.

In this embodiment, the storage unit 82 is provided that stores a rotational angle about the cylindrical rotator 2 as a parameter for numerical data. The control unit 81 has the function of calibrating the position of the switchable reflector 23 by finely adjusting a parameter for a rotational angle about the cylindrical rotator 2 stored in the storage unit 82 positively or negatively in response to a signal indicating the position of the switchable reflector 23 sensed by the mirror position sensor 43 for the switchable reflector 23. As a result, the position of the switchable reflector 23 can be initialized before use of the beam distributor 1.

In this embodiment, the control unit 81 is configured as follows. The control unit 81 exerts control to move the switchable reflector 23 to a position where a laser beam is to be reflected on the switchable reflector 23 toward the beam exit 41 by making the rotary drive motor 12 rotate the cylindrical rotator 2. Next, the control unit 81 exerts control to make the brake mechanism 13 apply a brake and then to output the laser beam. Further, the control unit 81 exerts control to release the brake by the brake mechanism 13 and then to make the rotary drive motor 12 move the switchable reflector 23 to a next position. Thus, even on the occurrence of vibration, etc., the switchable reflector 23 is less likely to move to reduce oscillation of a laser beam. As a result, the laser beam can be output more stably.

Second Embodiment

Figure 5:
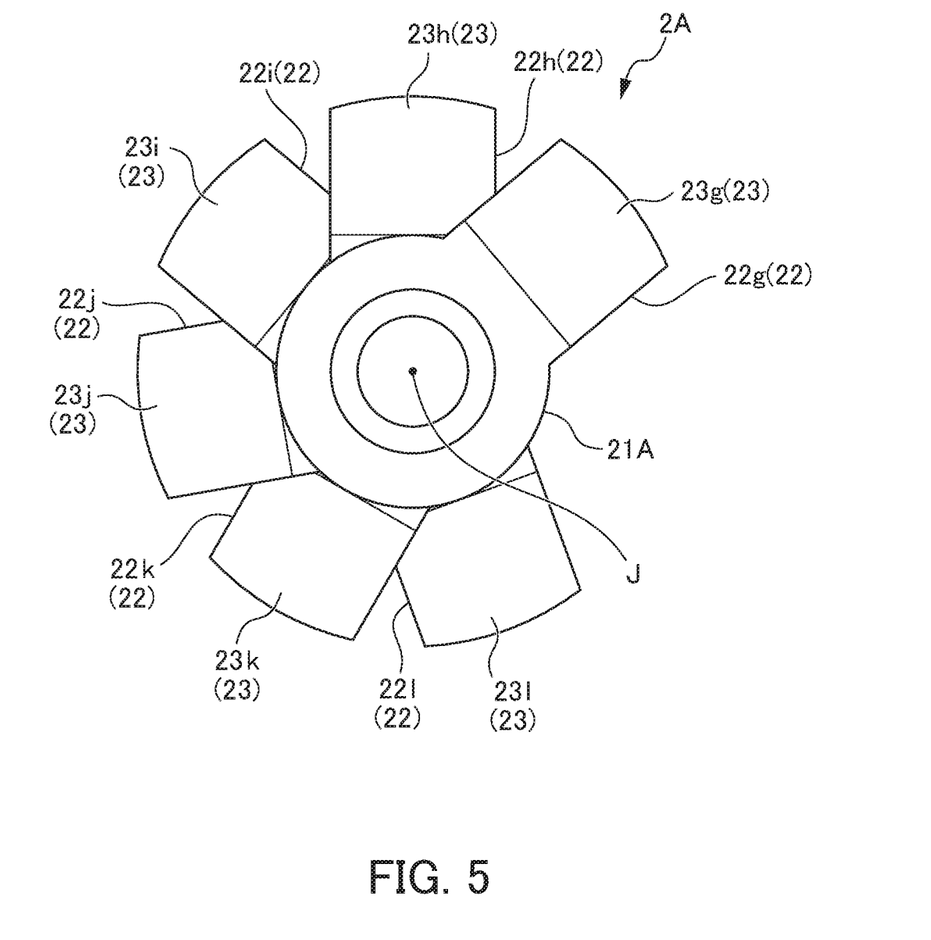
FIG. 5 shows a cylindrical rotator of a beam distributor according to a second embodiment when viewed in the direction of a rotary axis.

FIG. 5 shows a cylindrical rotator 2A of a beam distributor according to a second embodiment when viewed in the direction of a rotary axis J of the cylindrical rotator 2A.

As shown in FIG. 5, the configuration of the second embodiment is similar to that of the first embodiment, except that the configurations of six switchable reflectors 23 of the cylindrical rotator 2A differ from those of the first embodiment.

As shown in FIG. 5, the cylindrical rotator 2A according to the second embodiment includes a rotator body 21A and six tilted protrusions 22. Instead of the tilted protrusions 22a, 22b, 22c, 22d, 22e, and 22f according to the first embodiment shown in FIG. 1, the six tilted protrusions 22 are aligned from left to right in the direction of the rotary axis J of FIG. 1 in the following order: a tilted protrusion 22g, a tilted protrusion 22h, a tilted protrusion 22i, a tilted protrusion 22j, a tilted protrusion 22k, and a tilted protrusion 22l. The tilted surfaces of the six tilted protrusions 22g, 22h, 22i, 22j, 22k, and 22l form six switchable reflectors 23g, 23h, 23i, 23j, 23k, and 23l respectively.

As shown in FIG. 5, in the second embodiment, the six tilted protrusions 22g, 22h, 22i, 22j, 22k, and 22l are aligned circumferentially in this order while partially overlapping each other when viewed in the direction of the rotary axis J. The tilted protrusion 22g and the tilted protrusion 22l are spaced apart from each other circumferentially. There is no tilted protrusion 22 between the tilted protrusion 22g and the tilted protrusion 22l.

The six tilted protrusions 22g, 22h, 22i, 22j, 22k, and 22l (members forming the switchable reflectors 23g, 23h, 23i, 23j, 23k, and 23l respectively) are arranged in such a manner that the switchable reflectors 23 and/or the cylindrical rotator 2A, applies a weight to the rotary axis J uniformly in a balanced manner in response to the number of the switchable reflectors 23, the weights of the switchable reflectors 23, and/or balance of the weight of the cylindrical rotator 2A applied to the rotary axis J.

In the second embodiment, the six switchable reflectors 23 are configured to be arranged in such a manner that the switchable reflectors 23 and the cylindrical rotator 2A apply weights to the rotary axis J uniformly in a balanced manner in response to the number of the six switchable reflectors 23, the weights of the switchable reflectors 23, or balance of the weight of the cylindrical rotator 2A applied to the rotary axis J. By doing so, even if the six tilted protrusions 22 have different weights or the cylindrical rotator 2A does not apply a weight uniformly to the rotary axis J in a balanced manner, a weight can still be applied uniformly to the rotary axis J in a balanced manner by adjusting the arrangement of the tilted protrusions 22, reducing the thickness of the cylindrical rotator 2A, or adding a weight to the cylindrical rotator 2A. Thus, in the second embodiment, nonuniform rotation or vibration of the cylindrical rotator 2A can be reduced like in the first embodiment, so that the switchable reflector 23 can be moved stably to a predetermined position. As a result, a tilt angle can be determined accurately for the switchable reflector 23.

Third Embodiment

Figure 6:
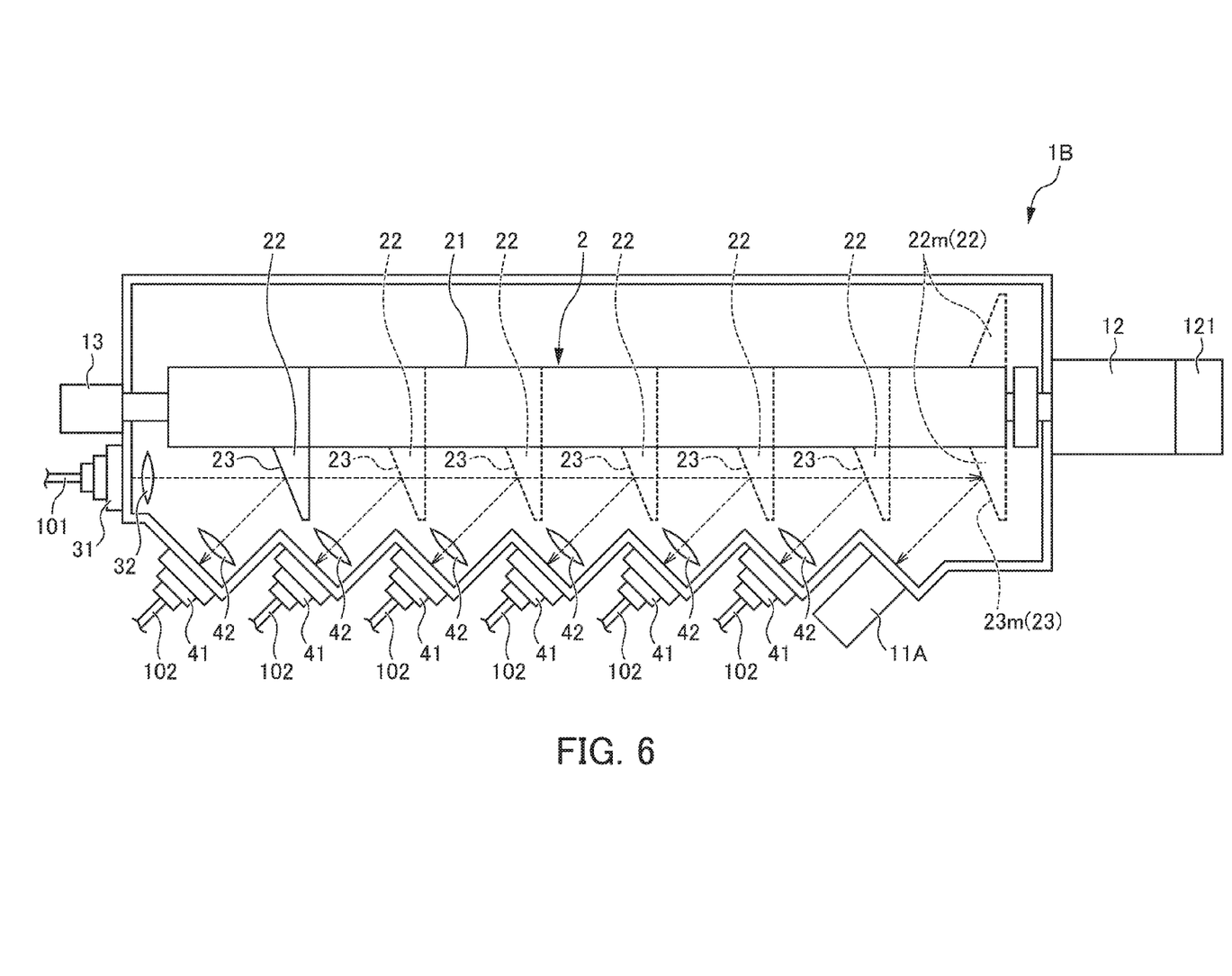
FIG. 6 shows the configuration of a beam distributor according to a third embodiment.

FIG. 6 shows the configuration of a beam distributor 1B according to a third embodiment. As shown in FIG. 6, the beam distributor 1B according to the third embodiment differs from that of the first embodiment mainly in the following ways. In the beam distributor 1 according to the first embodiment, the light absorber 11 is arranged at a position where light having passed through between the switchable reflectors 23 is to be absorbed, and a laser beam input through the input-side switchable reflector 33 is reflected while traveling parallel to the rotary axis J. By contrast, in the beam distributor 1B according to the third embodiment, light is reflected on a switchable reflector 23m at the end on the right side (opposite end side) of the cylindrical rotator 2 in the longitudinal direction and the reflected light is absorbed by a light absorber 11A. Further, a laser beam is input without intervention of the input-side reflector 33 to travel parallel to the rotary axis J, and the input laser beam is reflected on the switchable reflector 23m at an acute angle. In the description of the third embodiment, structures similar to those of the first embodiment will not be described.

The beam distributor 1B according to the third embodiment includes the switchable reflector 23m at the end on the right side (opposite end side) of the cylindrical rotator 2 in addition to the six switchable reflectors 23 of the beam distributor 1 according to the first embodiment. The switchable reflector 23m is arranged in space when viewed in the circumferential direction of the cylindrical rotator 2 where at least the multiple switchable reflectors 23 on the left side of the switchable reflector 23m are not arranged. Specifically, the switchable reflector 23m is arranged at least at a position not overlapping the multiple switchable reflectors 23 on the left side of the switchable reflector 23m when viewed in the direction of the rotary axis J. The switchable reflector 23m may be arranged to extend over an entire area of the cylindrical rotator 2 in the circumferential direction. While the switchable reflectors 23 of the beam distributor 1 according to the first embodiment are formed at a tilt angle at which an input laser beam is to be reflected 90 degrees, the seven switchable reflectors 23 of the beam distributor 1B according to the third embodiment are formed at a tilt angle at which an input laser beam is to be reflected at an acute angle.

The beam distributor 1B according to the third embodiment adjusts a rotational position about the cylindrical rotator 2 to rotationally move an input laser beam to a position where the laser beam is to be reflected on the switchable reflector 23 toward a selected one of the beam exits 41 or a position where the laser beam is to be reflected on the switchable reflector 23m as one of the switchable reflectors 23 to be absorbed by the absorber 11A.

The beam distributor 1B according to the third embodiment having the above-described configuration achieves the following effect in addition to the effect achieved by the first embodiment. In comparison to that of the first embodiment, the light absorber 11A according to this embodiment can be separated further from the rotary drive motor 12. Thus, the switchable reflector 23 is designed more flexibly to achieve a beam distributor having a compact outer shape.

Fourth Embodiment

Figure 7:
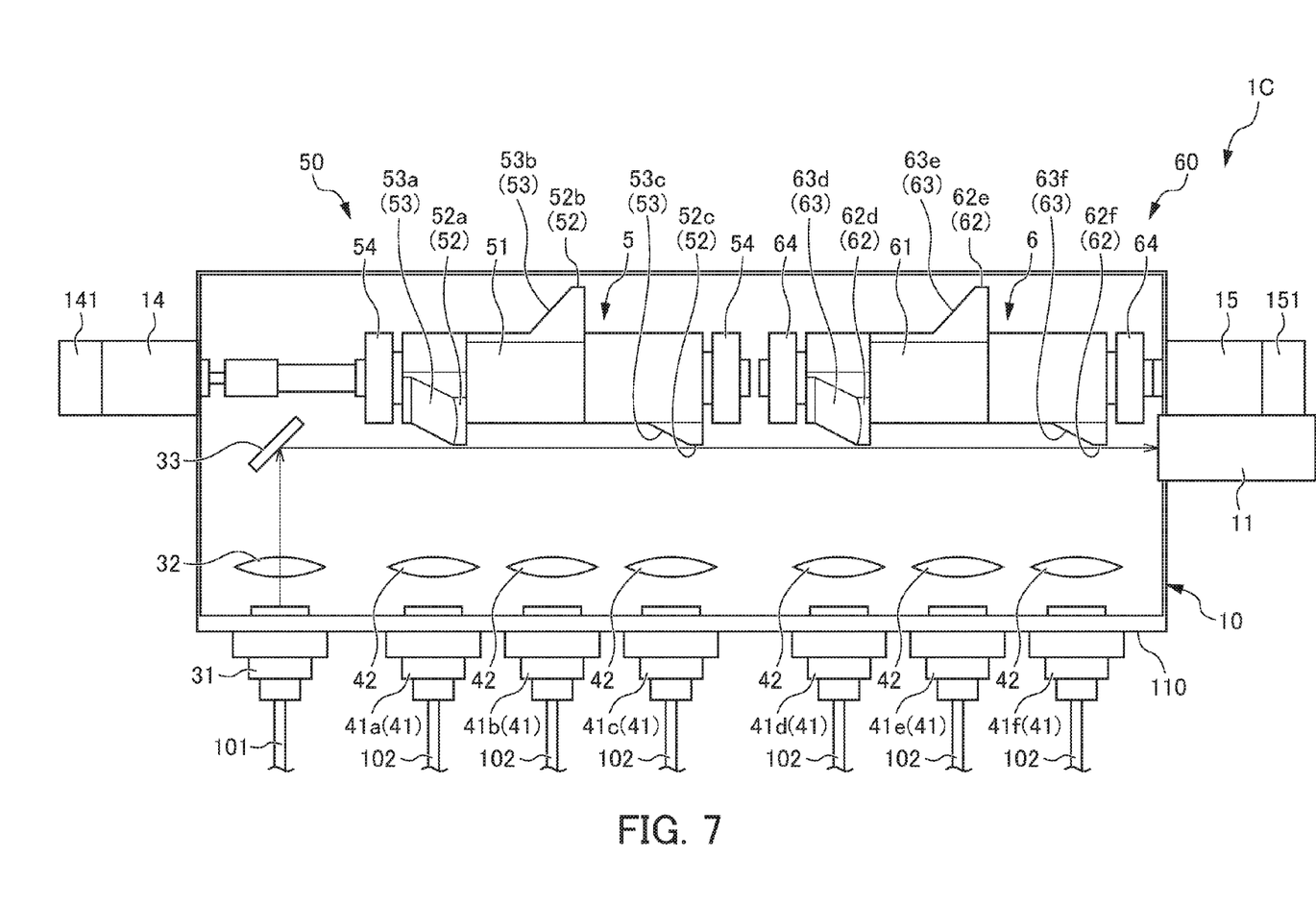
FIG. 7 shows the configuration of a beam distributor according to a fourth embodiment.
Figure 8A:
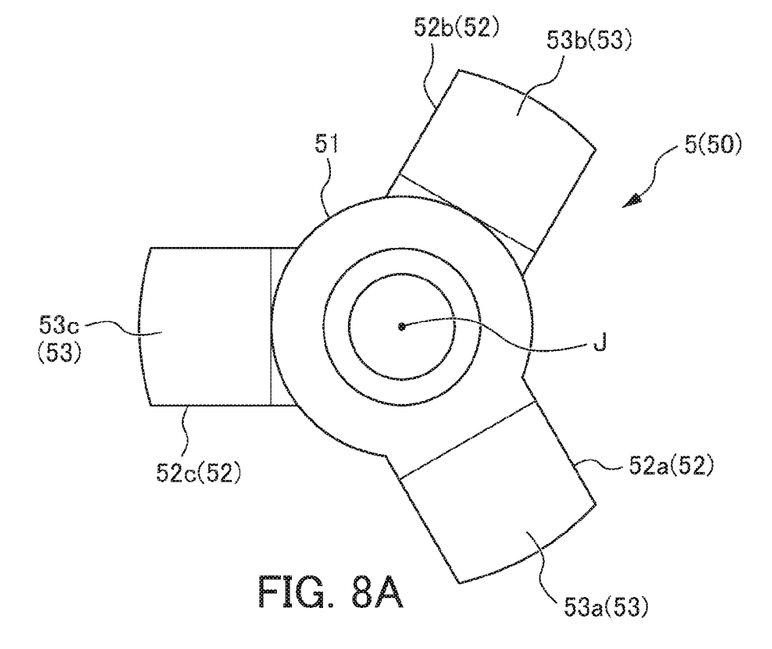
FIG. 8A shows a first cylindrical rotator of the beam distributor according to the fourth embodiment when viewed in the direction of a rotary axis.
Figure 8B:
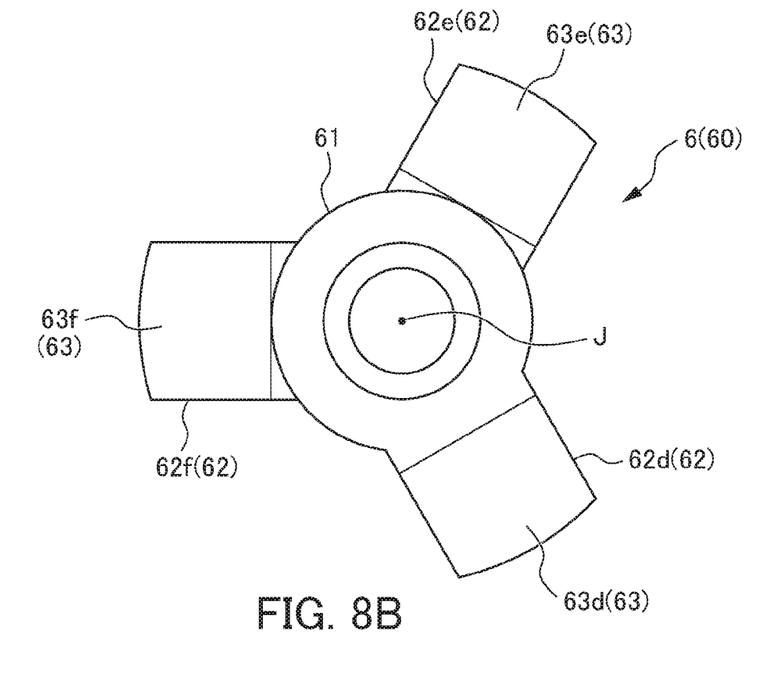
FIG. 8B shows a second cylindrical rotator of the beam distributor according to the fourth embodiment when viewed in the direction of a rotary axis.

FIG. 7 shows the configuration of a beam distributor 1C according to a fourth embodiment. FIG. 8A shows a first cylindrical rotator 5 of the beam distributor 1C according to the fourth embodiment when viewed in the direction of a rotary axis J. FIG. 8B shows a second cylindrical rotator 6 of the beam distributor 1C according to the fourth embodiment when viewed in the direction of a rotary axis J. As shown in FIG. 7, in comparison to the beam distributor 1 according to the first embodiment, the beam distributor 1C according to the fourth embodiment differs mainly in the following ways. The beam distributor 1 according to the first embodiment includes the cylindrical rotator 2. By contrast, the beam distributor 1C according to the fourth embodiment includes the first cylindrical rotator 5 and the second cylindrical rotator 6 aligned in the direction of the rotary axis J. In the description of the fourth embodiment, structures similar to those of the first embodiment will not be described.

The beam distributor 1C according to the fourth embodiment includes a first rotator unit 50 and a second rotator unit 60. The first rotator unit 50 and the second rotator unit 60 are aligned along a path for a laser beam. The first rotator unit 50 is arranged on the left side (one end side) of the case body 10. The second rotator unit 60 is arranged on the right side (opposite side) of the case body 10. The rotary axis J of the first rotator unit 50 and the rotary axis J of the second rotator unit 60 are coaxial with each other. A laser beam propagates parallel to the rotary axis J of the first rotator unit 50 and the rotary axis J of the second rotator unit 60.

The first rotator unit 50 includes the first cylindrical rotator 5 (cylindrical member) and a first rotary drive motor 14 (rotation mechanism). The first cylindrical rotator 5 includes a first rotator body 51 and three first tilted protrusions 52. The first rotator body 51 extends in the direction of the rotary axis J and is rotatable about the rotary axis J.

The three first tilted protrusions 52 are formed to protrude from the circumferential surface of the first rotator body 51. As shown in FIG. 7, the three first tilted protrusions 52 are aligned from left to right when viewed in the direction of the rotary axis J in the following order: a first tilted protrusion 52a, a first tilted protrusion 52b, and a first tilted protrusion 52c. As shown in FIG. 8A, the three first tilted protrusions 52 are uniformly spaced apart from each other circumferentially when viewed in the direction of the rotary axis J. The tilted surfaces of the first tilted protrusions 52a, 52b, and 52c form three first switchable reflectors 53a, 53b, and 53c respectively.

The first rotary drive motor 14 is connected on the left side of the first cylindrical rotator 5. The first rotary drive motor 14 is formed of a servo motor and includes a built-in position detector 141. Drive of the first rotary drive motor 14 is controlled by a control unit (not shown in the drawings).

The second rotator unit 60 includes the second cylindrical rotator 6 (cylindrical member) and a second rotary drive motor 15 (rotation mechanism). The second cylindrical rotator 6 includes a second rotator body 61 and three second tilted protrusions 62. The second rotator body 61 extends in the direction of the rotary axis J and is rotatable about the rotary axis J.

The three second tilted protrusions 62 are formed to protrude from the circumferential surface of the second rotator body 61. As shown in FIG. 7, the three second tilted protrusions 62 are aligned from left to right when viewed in the direction of the rotary axis J in the following order: a second tilted protrusion 62d, a second tilted protrusion 62e, and a second tilted protrusion 62f. As shown in FIG. 8B, the three second tilted protrusions 62 are uniformly spaced apart from each other circumferentially when viewed in the direction of the rotary axis J. The tilted surfaces of the second tilted protrusions 62d, 62e, and 62f form three second switchable reflectors 63d, 63e, and 63f respectively.

The second rotary drive motor 15 is connected on the right side of the second cylindrical rotator 6. The second rotary drive motor 15 is formed of a servo motor and includes a built-in position detector 151. Drive of the second rotary drive motor 15 is controlled by the control unit (not shown in the drawings).

The beam distributor 1C including the first rotator unit 50 and the second rotator unit 60 having the above-described configurations can be used in combination and controlled together by the control unit (not shown in the drawings). The control unit (not shown in the drawings) selectively switches the beam exits 41 for output of a laser beam by moving the three first switchable reflectors 53 and the three second switchable reflectors 63 combined in multiple stages to positions causing reflection of the laser beam or positions not causing reflection of the laser beam.

The beam distributor 1C according to the fourth embodiment having the above-described configuration achieves the following effect in addition to the effect achieved by the first embodiment.

In the configuration of this embodiment, the first rotator unit 50 and the second rotator unit 60 are aligned along a path for a laser beam. The beam exits 41 for output of a laser beam are selectively switched by moving the first switchable reflectors 53 to be rotated by the first rotary drive motor 14 and the second switchable reflectors 63 to be rotated by the second rotary drive motor 15 with being combined in multiple stages along the path for the laser beam to positions causing reflection of the laser beam or positions not causing reflection of the laser beam.

Thus, the first cylindrical rotator 5 and the second cylindrical rotator 6 can be rotated and controlled separately in the first rotator unit 50 and the second rotator unit 60. This allows arrangement of the first cylindrical rotator 5 and the second cylindrical rotator 6 such that, during switching of a laser beam, the switchable reflector 53 or the switchable reflector 63 not contributing to reflection of the laser beam will not pass through an optical path for the laser beam. As a result, while input of a laser beam through the beam entrance 31 is stopped during switching of the laser beam, the laser beam can be switched to a different one of the beam exits 41 without causing reflection of the laser beam on the switchable reflector 53 or the switchable reflector 63 not contributing to reflection of the laser beam.

The present invention is not to be limited to each of the above-described embodiments. Various changes or modifications are also covered by the present invention as long as such changes or modifications fall in a range in which the object of the present invention can be achieved. In the above-described first embodiment, the six beam exits 41 and the six switchable reflectors 23 corresponding to the beam exits 41 are provided. However, these are not the only number of the beam exits 41 and that of the switchable reflectors 23. The number of the beam exits 41 and that of the switchable reflectors 23 corresponding to the beam exits 41 may be from two to five, seven, or more.

EXPLANATION OF REFERENCE NUMERALS 1, 1B, 1C Beam distributor
2, 2A Cylindrical rotator (cylindrical member)
5 First cylindrical rotator (cylindrical member)
6 Second cylindrical rotator (cylindrical member)
10 Case body (shielding member)
11, 11A Absorber (light absorber)
12 Rotary drive motor (rotation mechanism)
13 Brake mechanism (fixing mechanism)
14 First rotary dive motor (rotation mechanism)
15 Second rotary dive motor (rotation mechanism)
23 Switchable reflector (reflector)
31 Beam entrance
41 Beam exit
43 Mirror position sensor (reflector position sensing mechanism)
50 First rotator unit
53 First switchable reflector (reflector)
60 Second rotator unit
63 Second switchable reflector (reflector)
81 Control unit
82 Storage unit
J Rotary axis

What is claimed is:

1. A beam distributor comprising at least one beam entrance and at least two multiple beam exits, the beam distributor comprising:
   a cylindrical member rotatable about a central axis as a rotary axis;
   at least two multiple reflectors of the same number as the beam exits, the multiple reflectors being arranged at positions shifted from each other axially and circumferentially along a circumferential surface of the cylindrical member;
   a rotation mechanism that rotates the multiple reflectors about the rotary axis by rotating the cylindrical member about the rotary axis;

a fixing mechanism that fixes circumferential movement of the cylindrical member at the reflectors by fixing circumferential movement at the cylindrical member;

a reflector position sensing mechanism that senses a position of one of the reflectors;

a light absorber; and a control unit that controls the rotation mechanism so as to rotationally move the reflectors and controls the fixing mechanism so as to fix the reflectors, wherein the control unit controls the rotation mechanism so as to rotationally move a rotational position about the cylindrical member to a position where an input laser beam input through the beam entrance and traveling parallel to the rotary axis of the cylindrical member is to be reflected on one of the reflectors toward a selected one of the beam exits, a position where the input laser beam is to pass through between adjacent ones of the reflectors to be absorbed by the light absorber, or a position where the input laser beam is to be reflected on one of the reflectors and absorbed by the light absorber, and the control unit controls the fixing mechanism so as to fix rotational movements of the reflectors at positions to which the reflectors have been moved rotationally.

2. The beam distributor according to claim 1, wherein members forming the multiple reflectors are arranged in such a manner that the multiple reflectors and/or the cylindrical member applies a weight to the rotary axis uniformly in a balanced manner in response to a number of the reflectors, weights of the multiple reflectors, or balance of a weight of the cylindrical member applied to the rotary axis.

3. The beam distributor according to claim 1, wherein the rotation mechanism includes a servo motor and a position detector that detects a rotational position about the servo motor.

4. The beam distributor according to claim 1, further comprising multiple rotator units each including the cylindrical member and the rotation mechanism that rotates the cylindrical member, wherein the multiple rotator units are aligned along a path for a laser beam, and the beam exits for output of the laser beam are selectively switched by moving the reflectors to be rotated by the rotation mechanisms while the reflectors being combined in multiple stages along the path for the laser beam to positions causing reflection of the laser beam or positions not causing reflection of the laser beam.

5. The beam distributor according to claim 1, comprising a shielding member that covers the cylindrical member and a path for a laser beam.

6. The beam distributor according to claim 1, wherein the reflector position sensing mechanism is an optical sensor that senses the position of one of the reflectors by reflecting light emitted from a light-emitting part on the reflector and receiving the reflected light at a light-receiving part, or an optical sensor that detects the position of one of the reflectors by sensing light having passed through a slit provided in the reflector.

7. The beam distributor according to claim 1, comprising a storage unit that stores a rotational angle about the cylindrical member as a parameter for numerical data, wherein the control unit has the function of calibrating the position of the reflector by finely adjusting the parameter for the rotational angle about the cylindrical member stored in the storage unit positively or negatively in response to a signal indicating the position of the reflector sensed by the reflector position sensing mechanism.

8. The beam distributor according to claim 1, wherein the control unit exerts control to move the reflector to a position where a laser beam is to be reflected toward one of the beam exits by making the rotation mechanism rotate the cylindrical member, thereafter exerts control to make the fixing mechanism apply a brake and then to output the laser beam, and thereafter exerts control to release the brake by the fixing mechanism and then to make the rotation mechanism move the reflector to a next position.

* * * * *